Nov. 28, 1961　　　C. M. KLINE　　　3,010,295
JOINT
Filed June 27, 1960

INVENTOR
CHARLES M. KLINE
By Joseph Allen Brown
ATTORNEY

United States Patent Office 3,010,295
Patented Nov. 28, 1961

3,010,295
JOINT
Charles M. Kline, Adamstown, Pa., assignor to Sperry Rand Corporation, New Holland, Pa., a corporation of Delaware
Filed June 27, 1960, Ser. No. 39,015
5 Claims. (Cl. 64—17)

This invention relates to tube type conveyors and more particularly to a universal joint for connecting the adjacent ends of two tube sections of such a conveyor.

In the agricultural field, one type of tube feeder comprises a hopper into which material to be fed is placed. The hopper has a bottom outlet opening into which an auger projects. The auger operates to withdraw material from the hopper and convey it through tube sections interconnected to form a continuous tube extending from the hopper. The tube has a plurality of longitudinally spaced openings through which material is discharged to thereby provide for the discharge of material along the length of the tube.

The tube sections which make up the tube conveyor may be of any desired length, such as ten feet long. If a given feeder installation is to be one hundred fifty feet long, then fifteen tube sections are connected together to make up the overall tube conveyor. The tube sections are mounted on supporting structure with their axes common. However, variations in tolerances in constructing the support for the tube conveyor produces some slight angular displacement of one tube section relative to an adjacent tube section. While such displacement is relatively unimportant when found in stationary tube arrangements, it provides a relatively serious problem when the tube is of the so-called "dump tube" type, that is, a tube conveyor rotatable about its longitudinal axis to dump the contents of the tube. Any misalignment of one tube section relative to an adjacent tube section will cause binding when an attempt is made to rotate the tube. This results in wear and tear on the parts involved and much more power is required to rotate the tube.

A main object of this invention is to provide a universal joint for connecting the adjacent ends of tubular sections of a dump tube type of feeder.

Another object of this invention is to provide a universal joint which does not restrict or in any way interfere with the flow of material through the tube.

Another object of this invention is to provide a universal joint which will allow some displacement of one tube section relative to an adjacent tube section without producing a binding condition.

A further object of this invention is to provide a universal joint, in a tube feeder of the character described, having a single part which serves the dual function of providing a connector member and a limit means to establish a maximum displacement of one tube section relative to an adjacent tube section.

A still further object of this invention is to provide a universal joint of the character described which is of simple and economical construction whereby it may be manufactured, assembled and repaired at low cost.

Other objects of this invention will be apparent hereinafter from the specification and from the recital in the appended claims.

Figure 1:
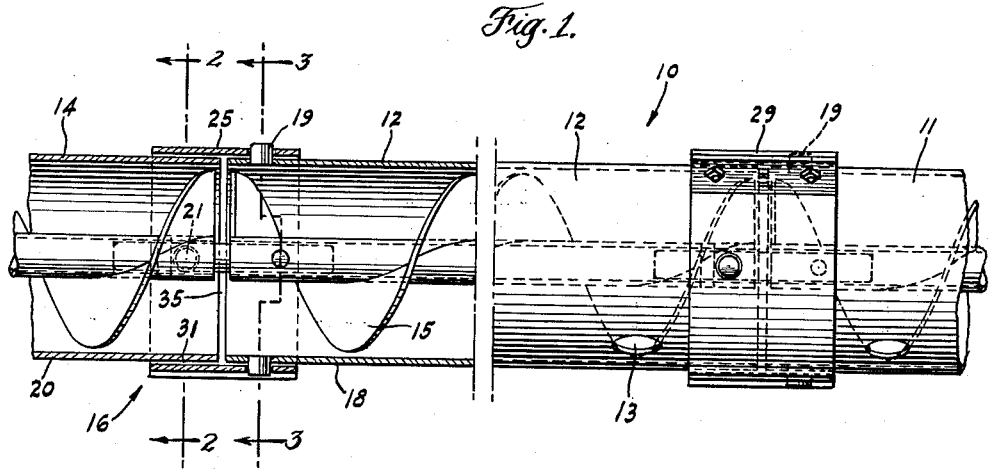
FIG. 1 is a fragmentary part side elevation, part longitudinal vertical section of a tube conveyor showing universal joints for connecting adjacent tube sections to each other constructed according to this invention.

Referring now to the drawings by numerals of reference, and particularly to FIG. 1, 10 denotes a tube conveyor which is made up of a plurality of tube sections, three of which are shown namely, sections 11, 12 and 14. All of the tubular sections are of the same inside and outside diameter. They are adapted to be mounted and disposed as shown with their axes common. Extending through the tube sections is an auger conveyor 15 made up of a plurality of auger sections, there being one auger section for each tube section. The tube sections have outlet openings 13 through which material conveyed by the auger may be discharged.

Connecting the adjacent ends of the tube sections are universal joints 16. The universal connection between the adjacent ends of tube sections 12 and 14 will be described, it being understood that each universal joint along the length of the conveyor is the same.

The end 18 of tube section 12 has a pair of buttons 19. These buttons are cylindrical and project radially from the periphery of the tube section. The buttons 19 are disposed at diametrically opposite sides of the tube section, that is 180° apart. The buttons may be welded, brazed or otherwise affixed to the tube section. The adjacent end 20 of tubular section 14 has two buttons 21 projecting radially from the periphery of the tube section. The buttons 21 are displaced from each other 180° and 90° from the buttons 19 on the tube section 12. Therefore, it will be seen that each pair of buttons comprises two buttons spaced 180° apart and one pair is displaced 90° relative to the other pair. Further, the respective pairs of buttons are spaced axially relative to the tube, as shown.

To join the adjacent ends of the tube sections, a connector ring 25 is provided. This connector ring comprises two semi-circular sections 26 and 28, each of which embraces half of the conveyor tube. The sleeve sections have flanges 29 releaseably fastened together by bolts 30. The inside diameter of the connector sleeve 25 is greater than the outside diameter of the tube sections whereby a space 31 is provided between the connector sleeve and the periphery of the conveyor tube. The connector sleeve has a first pair of openings 32 through which the buttons 19 on tube section 12 project. The sleeve has a second pair of openings 34 through which the buttons 21 on tube section 14 project. Since the connector sleeve is made into two parts, it is readily positioned about the conveyor tube and then bolted in place, with the buttons projecting through the appropriate holes in the sleeve.

Figure 2:
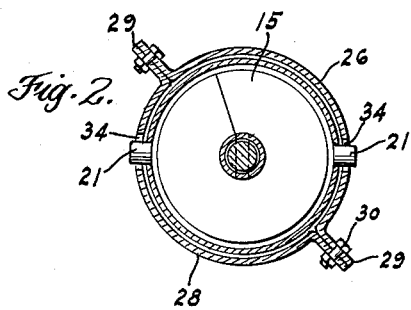
FIG. 2 is a section taken on the line 2—2 of FIG. 1 looking in the direction of the arrows.
Figure 3:
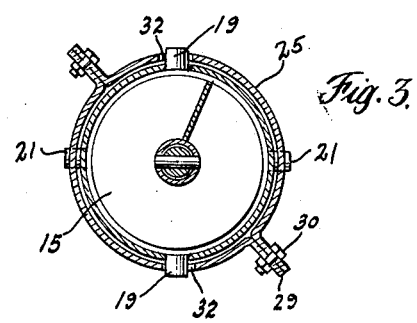
FIG. 3 is a section taken on the line 3—3 of FIG. 1 looking in the direction of the arrows.

It will be noted, particularly from FIGS. 2 and 3, that the openings in the connector sleeve for the buttons on the tube sections are larger in size than the buttons which project through them. Also, the respective pairs of buttons are so located relative to the connector ring 25 and the holes therein that when two tube sections are connected together by the joint 16 a space 35 (FIG. 1) is provided between the adjacent ends of the tube sections.

Figure 4:
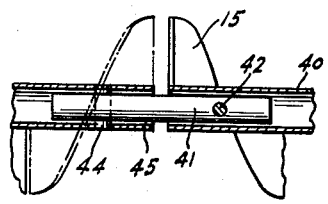
FIG. 4 is a fragmentary longitudinal vertical section through the auger of the conveyor.

At each universal joint 16, the respective auger sections are connected by a universal as shown in FIG. 4. The auger 15 has a tubular shaft 40 and the adjacent shaft sections are interconnected by a link 41. One end of the link is connected to an auger shaft by a transverse pin 42 while the other end of the link is connected to the auger shaft by a vertical pin 44. A clearance space 45 is provided between the periphery of link 41 and the bore of the auger shaft whereby one auger section may pivot slightly relative to a next auger section.

Figure 5:
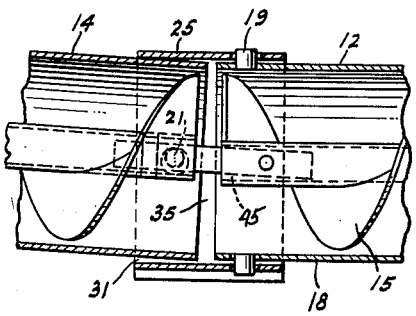
FIG. 5 is a view similar to the left or sectioned end of FIG. 1 and showing one tube section angularly displaced relative to its adjacent tube section.

The universal joint 16 will allow some angular displacement of one tube section relative to an adjacent tube section as shown in FIG. 5. The amount of angular displacement is relatively slight. However, such is adequate for solving binding problems and provides for greater freedom in manufacturing and installation tolerances. The end 18 of the tube section 12 may swing relative to the end 20 of the tube section 14 about the transverse axis provided by the buttons 19. The end 20 of the tube section 14 may pivot angularly relative to the end 18 of the section 12 about the transverse axis provided by buttons 21. The amount of angular movement is limited by the connector sleeve 25 (FIG. 5) which keeps the angularity of one tube section relative to an adjacent tube section within acceptable limits.

It will be apparent that the universal joint described above is extremely simple to fabricate and repair. In assembly, all that is necessary to conect two tube sections is to clamp the sections 26 and 28 of a connector sleeve about the adjacent ends of the two tube sections with the buttons on the tube sections projecting through the openings in the sleeve. Then the sleeve sections are bolted together using the bolts 30.

When it is desired to rotate or dump the conveyor tube, no binding will result and less power is required. Thereby, an irksome problem is avoided.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention, what I claim is:

1. A universal joint interconnecting the adjacent ends of two coextensive tubular members comprising a first pair of buttons affixed to and projecting radially from one of said tubular members and angularly spaced 180° apart, a second pair of buttons affixed to and projecting radially from the other of said tubular members and angularly spaced 180° apart and 90° relative to said first pair of buttons, said second pair of buttons being axially spaced from said first pair of buttons, and a connector sleeve surrounding said tubular members and having openings through which said buttons project, the inside diameter of said sleeve being greater than the outside diameter of said tubular members.

2. A universal joint as recited in claim 1 wherein auger sections extend through said tubular members, the adjacent ends of two auger sections being located at said universal joint and being connected by universal means.

3. A universal joint interconnecting the adjacent ends of two coextensive tubular members comprising a first pair of buttons affixed to and projecting radially from one of said tubular members and angularly spaced 180° apart, a second pair of buttons affixed to and projecting radially from the other of said tubular members and angularly spaced 180° apart and 90° relative to said first pair of buttons, said second pair of buttons being axially spaced from said first pair of buttons, a connector comprising two separable sections one of which surrounds a portion of said tubular members and the other of which surrounds the remainder of the members, said connector sections having openings through which said buttons project, and means for fastening said sections to each other.

4. A universal joint interconnecting the adjacent, spaced ends of two coextensive tubular members having a substantially common outside diameter, comprising a first pair of buttons affixed to and projecting radially from one of said tubular members and angularly spaced 180° apart, a second pair of buttons affixed to and projecting radially from the other of said tubular members and angularly spaced 180° apart and 90° relative to said first pair of buttons, said second pair of buttons being axially spaced from said first pair of buttons, a pair of members which form a connector sleeve surrounding said tubular members and having openings through which said buttons project, the size of said openings being materially larger than the size of said buttons and the inside diameter of the sleeve formed by said pair of members being greater than said common outside diameter of said tubular members, and releaseable means fastening said pair of members.

5. A universal joint connecting the adjacent ends of two coextensive tubular members without obstructing the interiors thereof whereby material may be freely conveyed through said members, comprising a first pivot means affixed to one of said tubular members in a given angular position and projecting outwardly thereof, a second pivot means affixed to the other of said tubular members in an angular position 90° from said given angular position and projecting outwardly of the other tubular member, said first and second pivot means being axially spaced, and means connecting said tubular members and said pivot means and limiting pivotal movement of said tubular members relative to each other, said connecting means comprising a sleeve surrounding said adjacent ends of said tubular members, the length of said sleeve being substantially less than the length of said tubular members and the inside diameter of the sleeves being greater than the outside diameters of said tubular members.

References Cited in the file of this patent

UNITED STATES PATENTS

| 2,711,199 | Salsberg | June 21, 1955 |
| 2,936,185 | Olsen et al. | May 10, 1960 |

FOREIGN PATENTS

| 569,632 | Great Britain | June 1, 1945 |